United States Patent [19]
Guenther et al.

[11] 3,766,341
[45] Oct. 16, 1973

[54] LOCKING DEVICE

[75] Inventors: Kenneth L. Guenther, Mt. Prospect; Charles P. Barcik, Westchester, both of Ill.

[73] Assignee: Ramm Industries, Chicago, Ill.

[22] Filed: Feb. 20, 1973

[21] Appl. No.: 333,623

[52] U.S. Cl. .................................................. 200/44
[51] Int. Cl. .......................................... H01h 27/00
[58] Field of Search ........................... 200/44, 42 R; 307/10 AT; 340/64; 180/114

[56] References Cited
UNITED STATES PATENTS
3,560,673  2/1971  Schweizer et al. ..................... 200/44
3,160,720  12/1964  Faulkner .............................. 200/44

*Primary Examiner*—Herman J. Hohauser
*Attorney*—William E. Dominick

[57] ABSTRACT

A locking device for the electrical ignition system and the hood of a motor vehicle which has a reciprocable tumbler member slidable longitudinally in a housing section mounted within the passenger compartment of the vehicle with a flexible control member extending from the tumbler to a hood latch pin for moving the latch pin into and out of locking engagement with a hook member secured to the underside of the vehicle hood within the motor compartment, and the tumbler member adapted to be moved into and out of operating engagement with an electrical switch means which is adapted to electrically ground the electrical ignition system of the motor when the tumbler is in a forwardly hood locking position. The locking device preferably includes a "fail safe" connection between the switch means and the ignition system which prevents the motor being started when all of the electrical connections between the switch means and the ignition system are severed.

3 Claims, 7 Drawing Figures

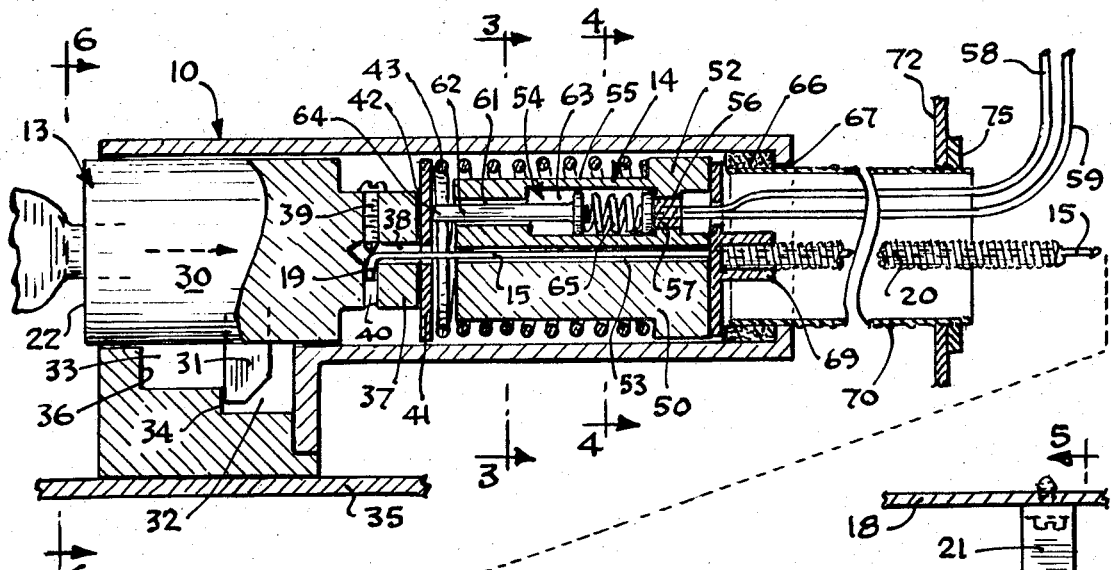
FIG.1
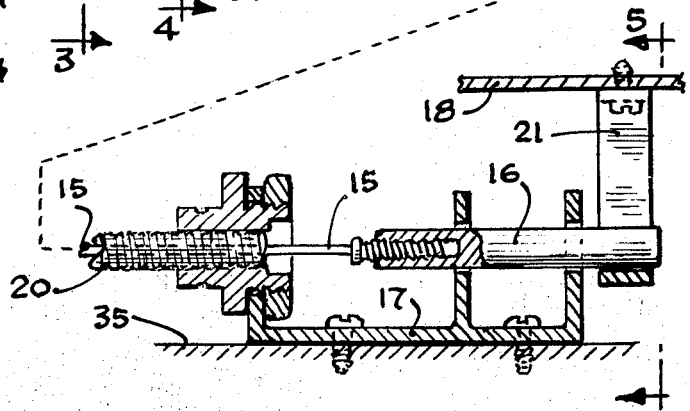
FIG.2
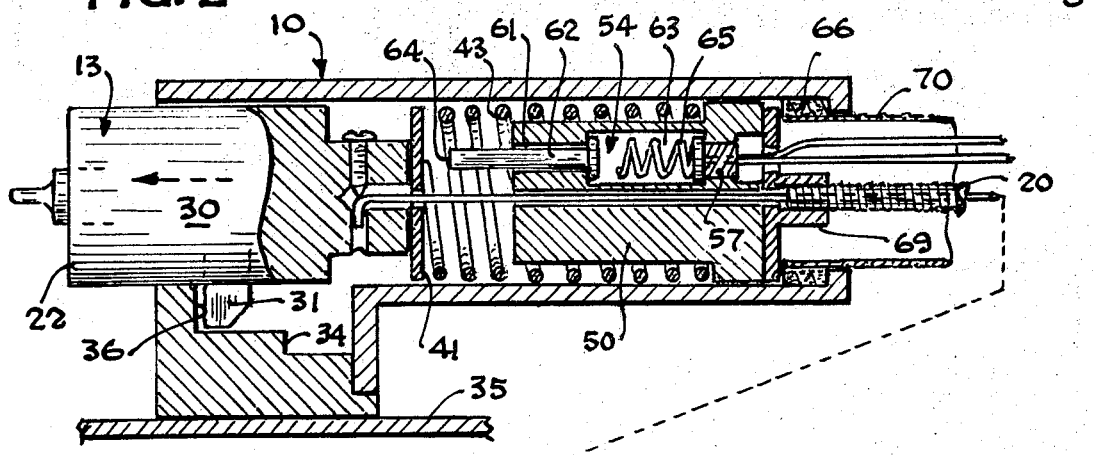
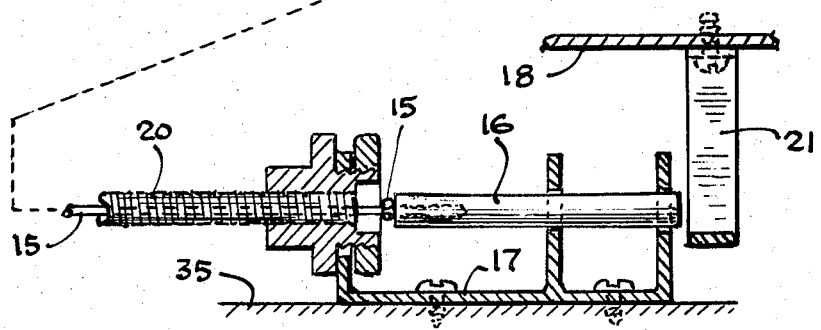

LOCKING DEVICE

The present invention relates generally to a motor vehicle anti-theft device and more particularly to an improved device for preventing the unauthorized operation of a motor vehicle which preferably has in combination therewith means for preventing the theft of equipment below the hood of the motor vehicle.

The present invention is an improvement over the locking device of U.S. Pat. No. 3,538,725 which discloses a remotely controlled lock for the hood of a motor vehicle in combination with an electrical switch means for rendering the ignition system of a motor vehicle inoperative. The locking device of U.S. Pat. No. 3,538,725 is relatively expensive to manufacture, because of the number of small parts required, and the electrical switch means for grounding the ignition system of the patented locking device can be made ineffective by severing the electrical connection leading from the ignition system to the electrical switch means.

It is therefore an object of the present invention to provide an improved locking device for a motor vehicle which is more economical to manufacture and more reliable.

It is a further object of the present invention to provide in a locking device for a motor vehicle an improved auxiliary electrical switch means for rendering the ignition system of a motor vehicle inoperative.

It is still another object of the present invention to provide in a locking device for a motor vehicle ignition system which will maintain the ignition system inoperative even though the grounding connection leading from the ignition system to the locking device is severed.

Other objects of the present invention will be apparent to those skilled in the art from the following detailed description and claims when read in conjunction with the accompanying drawing; wherein FIG. 1 is a fragmentary schematic vertical sectional view partially in elevation of a motor vehicle locking device embodying the present invention comprising an ignition system grounding means in combination with a vehicle hood locking means;

FIG. 2 is a fragmentary schematic vertical sectional view partially in elevation of the locking device of FIG. 1 shown in an alternate position of adjustment;

Figure 3:
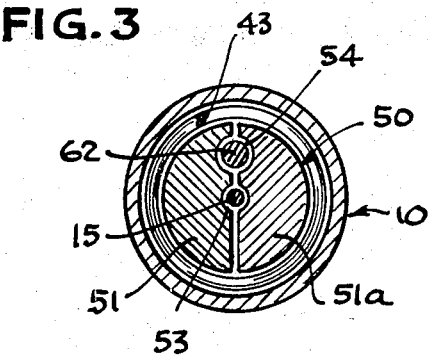
FIG. 3 is a vertical sectional view taken along the line 3—3 of FIG. 1.
Figure 4:
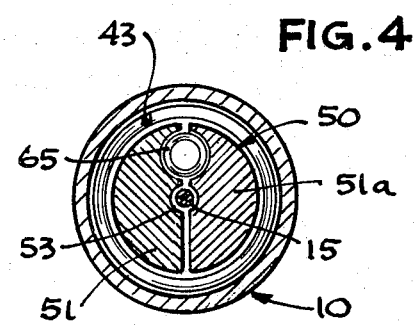
FIG. 4 is a vertical sectional view taken along the line 4—4 of FIG. 1.

A preferred embodiment of a locking device which embodies the present invention is shown in FIGS. 1-6 and comprises a cylindrical housing section 10 having at the inner end a mounting base section 11 which together with the lower closure plate 12 provides means for attaching the housing section 10 to the frame 35 of a motor vehicle body. The cylindrical housing section 10 is preferably mounted on the underside of the dashboard of the motor vehicle near the operator's seat. Disposed within the cylindrical interior of the housing section 10 is a reciprocable cylindrical tumbler lock 13 having the novel ignition system electrical grounding switch means 14 operatively associated therewith.

Figure 6:
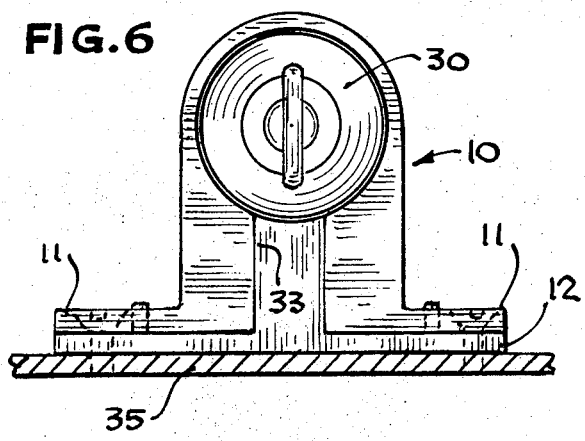
FIG. 6 is an end view taken along the line 6—6 of FIG. 1.
Figure 5:
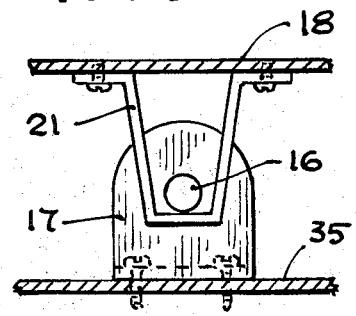
FIG. 5 is a front end view taken along the line 5—5 of Fig. 1.
Figure 7:
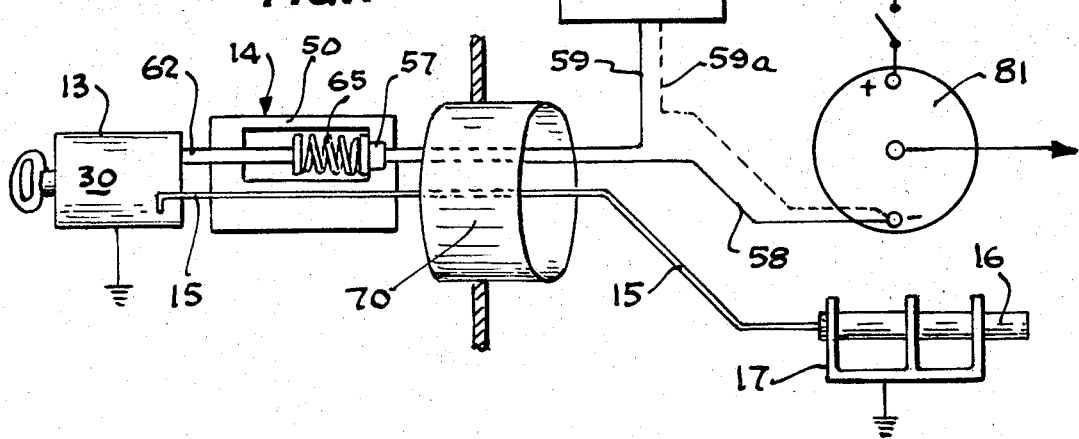
FIG. 7 is a diagrammatic illustration of the electrical circuit employed in the locking device of FIG. 1.

The reciprocable tumbler lock 13 in the preferred embodiment shown in FIGS. 1-6 also has operatively connected to the outer end thereof an elongated flexible steel wire 15 which extends forwardly into the engine compartment of the automobile and has a latch pin 16 affixed to the outer end thereof. The latch pin 16 is reciprocably movable within a latch pin bracket 17 which is fixedly attached to the frame 35 of the motor vehicle at a point below the hood 18 of the motor vehicle. The flexible steel wire 15 is protectively enclosed within a metal sheath 20 having the outer end thereof securely connected with the bracket 17 and the inner end thereof is effectively held within the cylindrical housing 10. The flexible wire is reciprocably movable within the sheath 20. Thus, when the tumbler lock 13 is pushed forwardly within the cylindrical housing 10, the flexible steel wire 15 moves the latch pin 16 forwardly into locking engagement with a depending retainer hook 21 secured to the under surface of the hood 18, as best shown in FIGS. 1 and 6. When the end of the tumbler lock 13 is moved rearwardly (i.e., inwardly), the latch pin 16 is disengaged from the retainer hook 21, permitting the hood 18 to be raised. The sheath 20 preferably is anchored to the vehicle frame at several points intermediate the ends thereof to obtain maximum relative movement between the sheath 20 and the wire 15.

The cylindrical tumbler lock 13 which is mounted in the proximate end of the housing section 10 for reciprocable axial movement therein is comprised of a cylindrical tumbler 30 having a spring loaded plunger 31 extending radially outwardly from the lateral surface thereof. The plunger 31 is adapted to engage the front wall or step 34 formed by the surface of the closure plate 12 seated in the slot 33 in the lateral wall of the housing section 10. The step 34 is spaced inwardly from the proximate end wall of the housing section 10 so that the proximate end 22 of the cylindrical tumbler 30 is about in the transverse plane of the proximate end wall of the housing section 10 when the spring loaded plunger engages the step 34. A key is provided for engaging the tumbler 30 for retracting the spring loaded plunger 31 sufficiently to permit the tumbler 30 to be moved within recess 32 outwardly until the end portion of the spring loaded plunger 31 engages the inner surface of the retainer stop 36 provided by the closure plate 12 adjacent the outer end of the housing section 10, thereby limiting the outwardly movement of the plunger 30 but permitting the tumbler 30 to move outwardly a sufficient distance to disengage the plunger 16 from the hook 21 and simultaneously opening the ignition system electrical grounding circuit, as will be described hereinafter.

The forward end of the cylindrical tumbler 30 is provided with a reduced diameter cylindrical end section 37 which has an axial passage 38 formed therein for receiving a hook 19 formed on the inner end of the flexible steel wire 15. A retainer pin 39 is inserted in one end of a transverse passage 40 formed in the reduced diameter end section 37 to fixedly attach hook 19 and the flexible wire 15 to the end section 37 of the tumbler 30. A retainer washer 41 of substantially the same diameter as the tumbler 30 is mounted over the end portion of wire 15 and contacts the end wall 42 of the reduced diameter end section 37, providing an abutment surface for a compression spring 43 disposed within the housing 10 for urging the tumbler 30 in an axially outwardly direction.

The ignition system electrical grounding switch means 14 which is operatively associated with the tumbler lock 13 and which is mounted within the outer end portion of the housing section 10 is comprised of cylindrical insulating body section 50 which is split into two halves 51, 51a, for ease of assembly. The body section 50 has an enlarged cylindrical outer end portion 52 and an elongated reduced diameter cylindrical portion 55. The body section 50 is provided with an axial passage 53 to permit the flexible wire 15 passing therethrough for connection with the tumbler 30. A second passage 54 is formed in the body section 50 spaced from the axial passage 53. The passage 54 extends the length of the body section 50 and has a restricted portion 56 at a point spaced inwardly from the outer end thereof for retaining fixedly therein an electrical contact eyelet 57. The eyelet 57 is connected electrically by means of a wire 58 leading from the primary winding of the ignition coil in the primary circuit of the vehicle's ignition system and a second electrical conductive wire 59 leads from the eyelet 57 to the breaker points 60 of the motor vehicle, also in the primary circuit of the vehicle's ignition system. Mounted in the inner end of the passage 54 is an electrically conducting contact pin 62 adapted to be moved reciprocably within the reduced diameter end portion 61 of the passage 54. Between the restricted portion 56 and the end portion 61 of the passage 54 an enlarged diameter portion 63 is provided which serves as a retaining chamber for an electrically conductive compression spring 65. The compression spring 65 preferably does not contact both the eyelet 57 and the end of pin 62 when the tumbler 30 is in the rearwardly "unlocked" position, but is adapted to form an electrical contact with both the eyelet 57 and the enlarged inner end of pin 62 when the lock tumbler 30 is moved forwardly into "locking" position. The length of the pin 62 is such that the outer end 64 cannot contact the retainer washer 41 when the tumbler 30 is in its maximum rearwardly extending (i.e., "unlocked") positions.

A spacer sleeve 66 is spot welded to the end of a length of flexible armored cable 70 and is mounted within the housing 10 between the outer end of the insulating body 50 and the inner end wall 67 of the housing section 10. Also mounted within the outer end of the housing section 10 is a retainer-T 69 which engages the enlarged end portion 52 of the insulating body 50 and the inner end of the sleeve 66. The inner end of the sheath 20 is fixedly attached to the retainer-T 69. A flexible armored cable 70 protectively encloses the hood latch control wire 15, the sheath 20 and the electrically conductive wires 58, 59 extending from within the interior of the engine compartment through the fire wall 72 to the housing section 10, thereby discouraging and making difficult any tempering with the electrical ignition wires and hood locking means. A clamp 75 is provided around the armored cable 70 adjacent the surface of the fire wall 72 within the engine compartment so as to prevent any portions of the electrical wires 58, 59 and the hood lock control wire 15 which are not enclosed in the armored cable 70 being pulled into the interior of the motor vehicle passenger compartment where the severing of the wires could be effected.

It will be evident in operating the locking device of FIGS. 1–6 that when the tumbler lock 13 is moved axially inwardly against the pressure of the compression spring 43 until the spring loaded plunger 31 engages the step 34 as shown in FIG. 1 so as to hold the tumbler 30 in its forwardly position within the housing section 10 the latch pin 16 will engage the hook 21 and retains the hood in locked position so that it is impossible to gain access to the interior of the engine compartment. Simultaneously, as the tumbler 30 moves forwardly into electrical contact with the end 64 of pin 62, electrical contact is made with contact eyelet 57 through the electrically conductive compression spring 65, thereby grounding the primary circuit through wire 58, because of the electrical contact between the tumbler 30 and the control wire 15 with the frame 35 of the motor vehicle. When the spring loaded plunger 30 is "unlocked" by inserting a key in the tumbler lock 13, the end of the tumbler 30 is moved outwardly by spring 43 until the plunger 31 engages the surface 36 (as shown in FIG. 2), and the latch pin 16 is moved out of engagement with the retainer hook 21, allowing the hood to be raised. Simultaneously, the movement of the tumbler 30 to "unlocked" position causes the tumbler 30 to move out of electrical contact with the end 64 of the pin 62, thereby removing the grounding connection between the primary circuit and the vehicle body, allowing current to flow in the low voltage primary ignition circuit through wires 58 and 59 from the battery 80 and coil 81 to the condenser and breaker points of the distributor 60 so that the motor vehicle can be operated in a normal manner when the main ignition key of the vehicle is turned on. It will be evident that if the electrical wires 58, 59, are severed the ignition system will still be inoperative despite the fact that the primary ignition circuit is no longer grounded. Thus, when all the wires within the armored cable are severed, the wire 59 which is an essential component of the motor vehicle primary ignition system will also be severed and thus prevent the motor being started, since wire 59 is the only electrical connection between the primary side of the coil 73 and the condenser and breaker points of the distributor 60. Thus, the ignition locking means of the present invention contains a "fail-safe" feature in addition to the conventional grounding of the ignition system which has heretofore been utilized. Significantly, the "fail-safe" feature of the present invention is effected without the use of any moving parts and without incorporating any additional switches in the system.

In a modified form of the present invention the electrically conductive wire 59 which leads from the contact eyelet 57 to the breaker points 60 can be omitted, if it is not desired to take advantage of the fail-safe feature of the preferred embodiment as above described. In the latter modification a wire 59a must be used to connect the negative terminal of the coil 81 with the condensor 60. It is possible also to run the wire 59a so that it extends into the cable 70 up to the switch means 14 without being electrically connected thereto, in which event wire 59a would provide the "fail-safe" feature similar to wire 59.

It is, of course, possible to utilize the invention herein described to effect grounding of the ignition system without using the hood locking structure, as when a motor vehicle is provided with another hood locking means. In the latter embodiment of the invention the coaxial control wire 19 with sheath 20, along with the latch pin 16, latch pin bracket 17, retainer hook 21 and associated parts are omitted, while retaining the remaining structure herein described.

In the foregoing description and in the claims which follow the term "motor vehicle" is intended to designate any type of vehicle which employs an engine with an electrical ignition system, including a motor boat, a motor cycle, and an airplane.

We claim:

1. In a locking device for an ignition system of a motor vehicle having a reciprocable tumbler mounted within a housing section which is adapted to be supported by the frame of a motor vehicle and electrically connected therewith, said tumbler in one position of adjustment adapted to be retained substantially within said housing section in an inwardly reciprocable position by a spring loaded plunger carried by said tumbler, and an electrical switch means for grounding the said ignition system of the motor vehicle contained within the said housing section and operably associated with said tumbler, the improvement comprising; an insulating switch body mounted within said housing section spaced axially inwardly from said tumbler and having a passage formed longitudinally therein, a fixed electrical contact eyelet connected by electrical conductive means with the primary circuit of the ignition system of the motor vehicle fixedly mounted within said passage adjacent the inner end thereof, said passage having an electrically conductive contact pin mounted for reciprocable movement in the opposite end thereof, an electrically conductive compression spring disposed in said passage between said fixed eyelet and said reciprocable contact pin urging said contact pin into electrical contact with said tumbler when said tumbler is held in said inwardly reciprocable position within said housing section, and said tumbler adapted to be urged out of electrical contact with said reciprocable contact pin by a second spring means when said tumbler is not retained in said inwardly reciprocable position; whereby said primary circuit is in electrically grounded connection with said frame of the motor vehicle when said tumbler is in the said inwardly reciprocable position of adjustment.

2. A locking device as in claim 1, wherein said electrical conductive means electrically connects said contact eyelet with both a primary winding and a portion of a distributor which form a part of said primary circuit of the ignition system of said vehicle and comprises the only electrical connection between said primary winding and said distributor.

3. A locking device as in claim 1, wherein said reciprocable tumbler has extending from one end thereof a flexible control wire which has the other end thereof operatively connected with a latch pin disposed within the engine compartment of said vehicle and adapted to operatively engage a hook member attached to the hood of said motor vehicle when said lock tumbler is moved into said forwardly reciprocable position of adjustment.

* * * * *